(12) United States Patent
Gessel et al.

(10) Patent No.: US 10,264,727 B2
(45) Date of Patent: Apr. 23, 2019

(54) DECKPLATE AUTO ADJUSTMENT MECHANISM FOR A HARVESTER ROW UNIT

(71) Applicant: CNH Industrial America LLC, New Holland, PA (US)

(72) Inventors: James M. Gessel, Geneseo, IL (US); Joel Cook, Lititz, PA (US); Eric Walker, Narvon, PA (US); Michael Berggren, Davenport, IA (US); Fred Hubach, Stevens, PA (US); Brian Crow, Rock Island, IL (US)

(73) Assignee: CHN Industrial America, LLC, New Holland, PA (US)

( * ) Notice: Subject to any disclaimer, the term of this patent is extended or adjusted under 35 U.S.C. 154(b) by 0 days.

(21) Appl. No.: 15/049,481

(22) Filed: Feb. 22, 2016

(65) Prior Publication Data
US 2017/0238467 A1    Aug. 24, 2017

(51) Int. Cl.
| A01D 57/22 | (2006.01) |
| A01D 45/02 | (2006.01) |
| A01D 47/00 | (2006.01) |
| A01D 101/00 | (2006.01) |

(52) U.S. Cl.
CPC .......... *A01D 57/22* (2013.01); *A01D 45/021* (2013.01); *A01D 45/023* (2013.01); *A01D 47/00* (2013.01); *A01D 2101/00* (2013.01)

(58) Field of Classification Search
CPC .... A01D 45/021; A01D 45/023; A01D 57/22; A01D 47/00; A01D 2101/00

USPC ............................................................. 56/62
See application file for complete search history.

(56) References Cited

U.S. PATENT DOCUMENTS

| 906,888 | A | | 12/1908 | Gasser | |
|---|---|---|---|---|---|
| 3,101,579 | A | * | 8/1963 | Karlsson .............. | A01D 45/021 56/105 |
| 3,126,690 | A | * | 3/1964 | Keller et al. ......... | A01D 45/025 56/107 |
| 3,589,110 | A | * | 6/1971 | Schreiner .............. | A01D 41/142 56/106 |
| 3,707,833 | A | * | 1/1973 | Sutton .................. | A01D 45/025 460/135 |
| 3,759,021 | A | | 9/1973 | Schreiner et al. | |
| 3,808,783 | A | | 5/1974 | Sutherland et al. | |
| 5,060,464 | A | * | 10/1991 | Caron .................. | A01D 45/021 56/119 |

(Continued)

FOREIGN PATENT DOCUMENTS

| EP | 1133911 | 11/2005 |
| FR | 1509507 A | 1/1968 |

*Primary Examiner* — Arpad Fabian-Kovacs
(74) *Attorney, Agent, or Firm* — Peter K. Zacharias; Patrick M. Sheldrake

(57) ABSTRACT

A row unit for a header of an agricultural harvester is provided that includes a first longitudinally extending stripping plate and a second longitudinally extending stripping plate each mounted on a frame and each having opposed stripping edges which define a gap between the first stripping plate and the second stripping plate. The row unit includes both operator-selected macro adjustment of the gap and automatic micro adjustment of the gap. The micro adjustment occurs on both deck plates. The micro adjustment is achieved through resilient members positioned functionally between the deck plates and the row unit frame.

19 Claims, 6 Drawing Sheets

(56) References Cited

U.S. PATENT DOCUMENTS

| | | | |
|---|---|---|---|
| 5,680,750 A | 10/1997 | Stefl | |
| 6,226,969 B1 | 5/2001 | Becker | |
| 6,237,312 B1* | 5/2001 | Becker | A01D 45/021 56/119 |
| 7,913,480 B2* | 3/2011 | Christensen | A01D 45/021 56/119 |
| 8,196,380 B2* | 6/2012 | Carboni | A01D 45/021 56/62 |
| 8,220,235 B2 | 7/2012 | Kowalchuk | |
| 8,224,534 B2 | 7/2012 | Kowalchuk | |
| 8,820,039 B2 | 9/2014 | Werning | |
| 9,179,602 B2* | 11/2015 | Vandeven | A01D 45/021 |
| 9,232,693 B2* | 1/2016 | Hendrickson | A01D 45/025 |
| 9,408,348 B2 | 8/2016 | Walker et al. | |
| 2008/0092507 A1 | 4/2008 | Bollig | |
| 2010/0251947 A1* | 10/2010 | Mariman | A01O 5/06 111/149 |
| 2011/0011048 A1* | 1/2011 | Hoffman | A01D 45/023 56/119 |
| 2011/0146217 A1* | 6/2011 | Carboni | A01D 45/021 56/60 |
| 2011/0146218 A1* | 6/2011 | Carboni | A01D 45/021 56/62 |
| 2011/0173942 A1* | 7/2011 | Kowalchuk | A01D 45/021 56/62 |
| 2012/0029757 A1* | 2/2012 | Kowalchuk | A01D 45/021 701/34.2 |
| 2014/0053524 A1* | 2/2014 | Werning | A01D 45/021 56/62 |
| 2014/0150394 A1* | 6/2014 | Calmer | A01D 45/021 56/106 |
| 2014/0331633 A1* | 11/2014 | Vandeven | A01D 45/021 56/62 |
| 2015/0319929 A1* | 11/2015 | Hendrickson | A01D 45/025 33/504 |
| 2016/0113199 A1 | 4/2016 | Jongmans et al. | |
| 2016/0174461 A1* | 6/2016 | Walker | A01D 45/021 56/119 |
| 2016/0174462 A1* | 6/2016 | Walker | A01D 45/021 56/119 |
| 2016/0174463 A1* | 6/2016 | Barry | A01D 45/021 56/62 |

* cited by examiner

DECKPLATE AUTO ADJUSTMENT MECHANISM FOR A HARVESTER ROW UNIT

BACKGROUND OF THE INVENTION

The subject application relates generally to corn header assemblies for use with agricultural harvesters. In particular, the subject application relates to an improved corn header assembly that includes a deck plate auto adjustment mechanism.

Agricultural harvesters that harvest corn are provided with headers having dividers, also generally known as snouts, for directing rows of corn stalks to row units that include ear separation mechanisms which include deck plates or stripping plates. The ears of corn are then passed to an auger for conveying the corn to a feeder house of the agricultural harvester. Thereafter harvested corn is then conveyed to the harvester's inner chambers for further processing.

Conventional corn header assemblies use e.g., a rock shaft to control the separation or spacing of the deck plates (also referred to as the gap) within a row unit. Such deck plate separation designs have a rocker arm mounted vertically to the row unit and a control linkage below the row unit to move the deck plates. As a result, adjustment of the deck plate opening from row to row can be difficult, jerky and imprecise. Mechanical tolerances which are built into such deck plate separation design in order to improve ease of deck plate movement also leads to backlash which affects the operator's ability to properly set the deck plates. Improperly set or poorly adjusted deck plates cause grain loss, ear damage and economic losses. Such designs are also bulky, heavy and take up valuable space underneath the corn header row unit. Further, such designs can generate excess debris which can lead to trash accumulation under the corn header assembly effecting overall header efficiency and operation. Debris can also accumulate within the deck plates themselves, including interstitial spaces of coil springs. In addition, conventional rocker shaft control systems typically control only one of the two deck plates of a single row unit which can lead to the deck plate opening (or gap) not being aligned with the center of the row unit stalk rolls. Similarly, conventional micro adjustment systems typically control only one of the two deck plates, with similar results.

BRIEF SUMMARY OF THE INVENTION

In accordance with a first aspect, the subject application provides a row unit for a header of an agricultural harvester including first and second deck plates each mounted on a frame and defining a gap between them. The row unit further includes a gap adjustment mechanism for adjusting a width of the gap. The gap adjustment mechanism includes a control arm, a first elongated linkage, a primary connection mechanism, and a secondary connection mechanism. The primary connection mechanism connects the first deck plate to the first elongated linkage and the control arm. The primary connection mechanism also has a first resilient member for resiliently acting upon the first deck plate. The secondary connection mechanism connects the first deck plate to the first elongated linkage.

In accordance with a second aspect, the subject application provides a row unit for a header of an agricultural harvester including a first deck plate assembly, a second deck plate assembly, and a control arm. The first deck plate assembly includes a first deck plate, a first elongated linkage, a primary connection mechanism, and a secondary connection mechanism. The primary connection mechanism connects the first deck plate and the first elongated linkage. The primary connection mechanism also has a first resilient member. The secondary connection mechanism connects the first deck plate and the first elongated linkage. The second deck plate assembly includes a second deck plate, a second elongated linkage, a tertiary connection mechanism, and a quaternary connection mechanism. The tertiary connection mechanism connects the second deck plate and the second elongated linkage. The tertiary connection mechanism also has a second resilient member. The quaternary connection mechanism connects the second deck plate and the second elongated linkage. The control arm connects to the primary and tertiary connection mechanisms for adjusting the position of the first and second deck plates.

In accordance with a further aspect, the subject application provides a deck plate assembly for an agricultural harvester row unit including a deck plate, an elongated linkage, a primary connection mechanism, and a secondary connection mechanism. The primary connection mechanism connects the deck plate to the elongated linkage. The primary connection mechanism includes an axle, a body, and a first resilient member. The axle is for mounting to a frame of the row unit. The body is pivotably connected to the axle, and the body has a first end connected to the elongated linkage and a second end connected to the deck plate. The first resilient member is mounted between the body and the axle. The secondary connection mechanism connects the deck plate to the elongated linkage.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

The terms "corn," "ear," "stalk," and "crop material" are used throughout the specification for convenience and it should be understood that these terms are not intended to be limiting. Thus, "corn" refers to that part of a crop which is harvested and separated from discardable portions of the crop material. The term "deck plate" is used interchangeably with the term "stripping plate."

Figure 1:
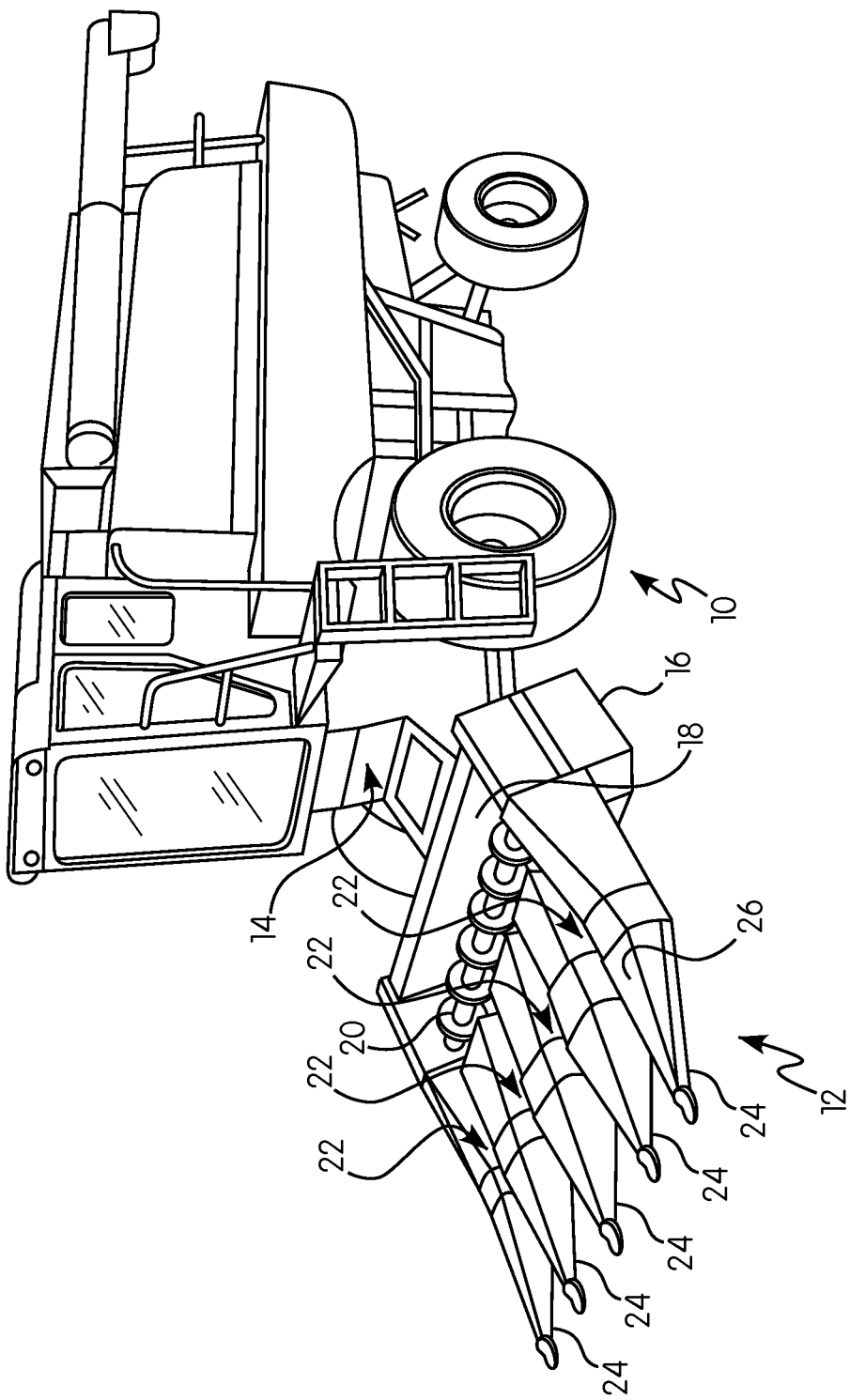
FIG. 1 is a perspective view of an agricultural harvester including a corn header according to an aspect of a preferred embodiment of the present invention.

Referring now to the drawings wherein aspects of the present invention are shown, FIG. 1 illustrates a corn header assembly 12 according to a preferred embodiment of the present invention as applied to agricultural harvester 10. The corn header assembly 12 is an improvement to current conventional corn header assemblies by incorporating a row unit 22 having a deck plate control system that can allow for more efficient adjustment of the deck plate opening to respond to variations in corn stalk width by way of a simple, compact design. In particular, the row unit 22 incorporates both macro predetermined control of the deck plate opening and automatic micro adjustment of the deck plate opening. The row unit 22 is shown to be operatively connected to the agricultural harvester 10 for harvesting corn and feeding the corn to a feeder house 14 for receiving crop residue, cutting, chopping and propelling the residue rearwardly and outwardly from the agricultural harvester 10 while retaining the valuable corn ears and kernels. Such feeder houses and harvesting operations are known in the art and a further detailed description of their structure, function and operation is not necessary for a complete understanding of the present embodiment. However, typical corn headers applicable to the subject disclosure are disclosed in U.S. Pat. Nos. 3,808,783 and 3,759,021, the entire disclosures of which are incorporated by reference herein for all purposes.

The corn header assembly 12 includes header frame 16 for mounting to a forward end of the agricultural harvester 10, a conveyor 20 (such as an auger) extending lengthwise across the header frame 16 for conveying crop material to the combine feeding location or feeder house 14 through channel 18 and a plurality of row units 22 extending forwardly from the header frame. The corn header assembly 12 further includes a plurality of dividers 24 extending forward from the header frame. Such dividers 24 are known in the art and a further detailed description of their structure, function and operation is not necessary for a complete understanding of the subject application.

Figure 2:
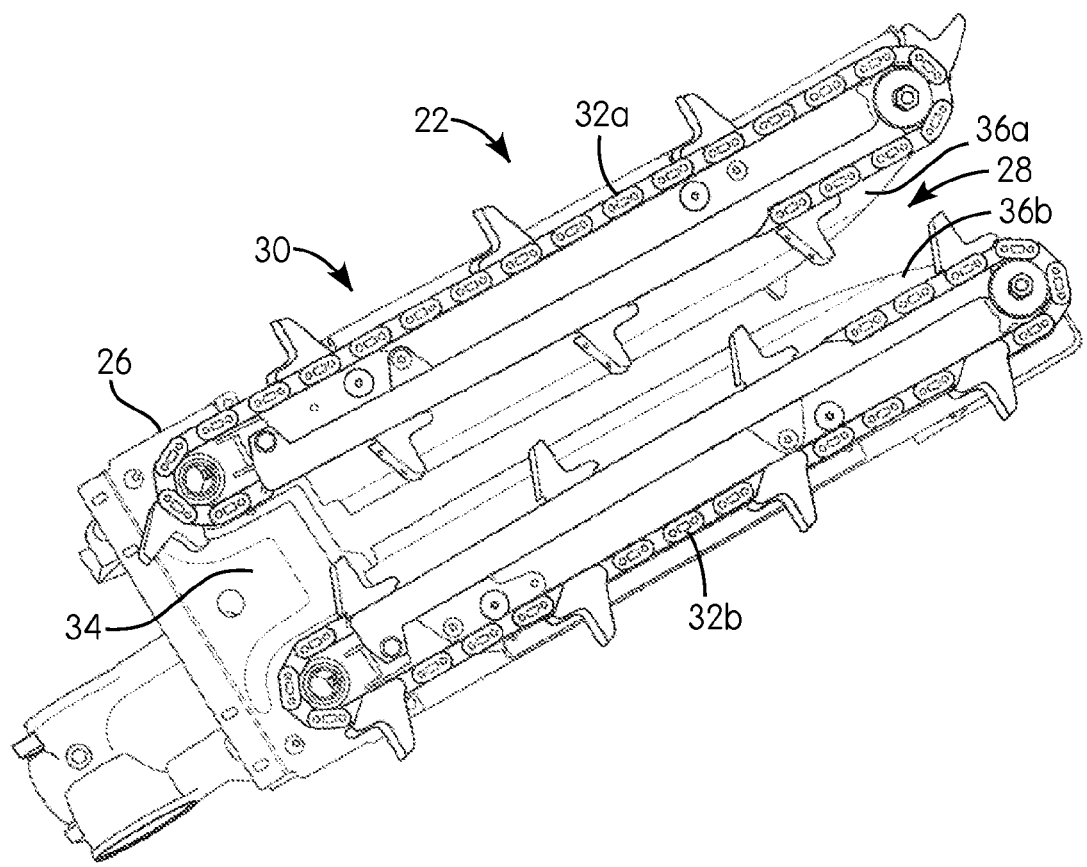
FIG. 2 is a top perspective view of a row unit of the corn header of FIG. 1.

As shown in FIG. 2 which is a perspective view of a single row unit 22 in accordance with an aspect of the present embodiment, stripping plates or deck plates 36a, 36b are shown which define a gap 28 therebetween which is open towards the forward end of the row unit 22. Breast plate 34 defines the closed end region of the gap 28 and is positioned at an end of the row unit 22 closest to the agricultural harvester 10, i.e., a proximal end of the row unit.

Figure 3:
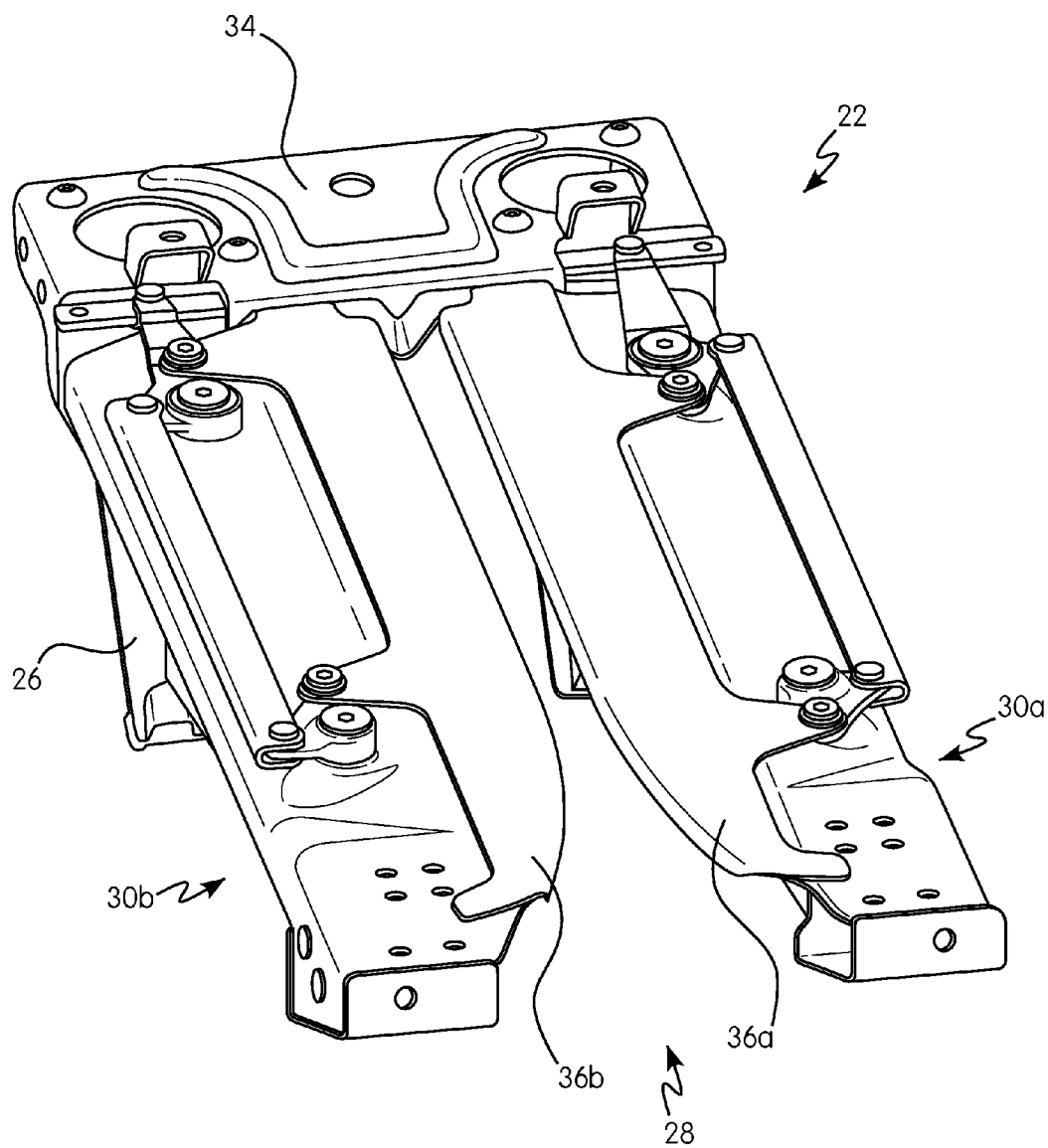
FIG. 3 is a front perspective view of the row unit of FIG. 2 with certain components omitted.

FIG. 3 shows a front perspective view of the row unit 22 without a gathering chain assembly. The row unit 22 includes frame 26 forming two row unit arms 30a, 30b, the breast plate 34, and the two stripping plates 36a, 36b which define the gap 28. The frame has a top side and a bottom side. A gear case (not shown) is positioned on a lower portion of the frame 26 to generate power to drive the gathering chains 32a, 32b of the row unit 22.

The row unit 22 includes a first longitudinally extending stripping plate 36a and a second longitudinally extending stripping plate 36b each mounted on the frame 26 and each having opposed stripping edges which define the gap 28 between the first and second stripping plates. In accordance with an aspect of the present embodiment the first deck plate may be positioned at an angle other than parallel with respect to the second deck plate. In such an aspect a relative angle between the first and second deck plates may be fixed at assembly of the row unit or may be adjustable by an operator. The ends of the first and second deck plates define a wedge opening through which corn enters the row unit. The wedge opening can be either set fixed in the design, or the design of the row unit can allow the front of the deck plates (that is the end of the deck plates through which corn enters the row unit) to be at a different width than the width of the rear of the deck plate e.g., wider towards the front and narrower towards the rear.

Figure 4:
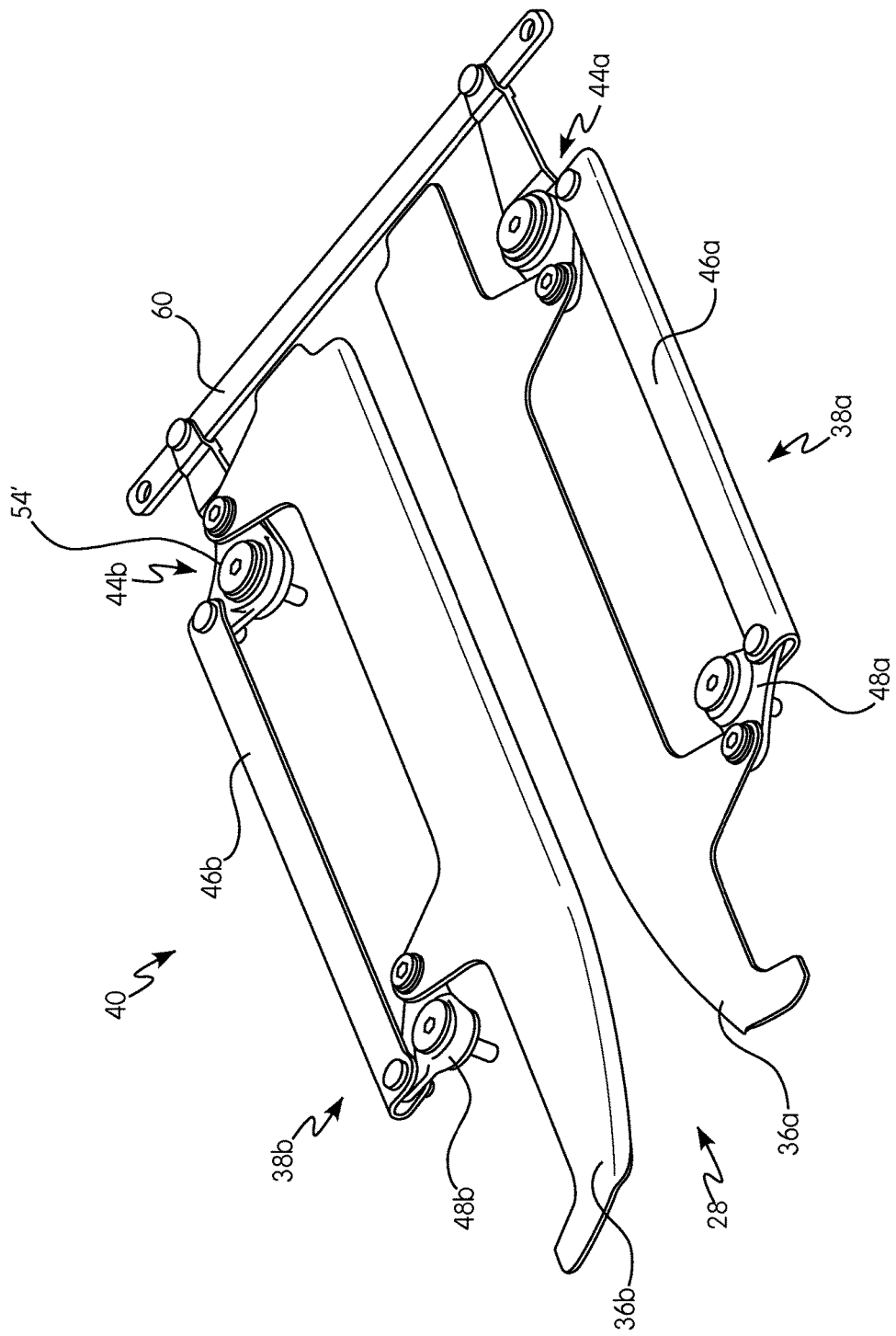
FIG. 4 is a top perspective view of a gap adjustment mechanism of the row unit of FIG. 2.

As shown in FIG. 4, the row unit 22 includes a gap adjustment mechanism 40 for adjusting a size or width of the gap 28. The gap adjustment mechanism 40 includes a first elongated linkage 46a extending in a lengthwise direction of the first longitudinally extending deck plate 36a, a primary connection mechanism 44a connecting the first elongated linkage 46a to the first deck plate 36a, and a control arm 60. The gap adjustment mechanism 40 can also include a second elongated linkage 46b extending in a lengthwise direction of the second longitudinally extending deck plate 36b and a tertiary connection mechanism 44b connecting the second elongated linkage 46b to the second deck plate 36b.

The control arm or crosslink 60 is operatively connected to the first and second elongated linkages 46a, 46b, for moving the first and second deck plates to predetermined positions. The elongated linkages can be positioned substantially transverse or perpendicular to the crosslink. Adjustment via the control arm 60 to predetermined positions and the resulting width of the gap 28 between the deck plates 36a, 36b constitutes a macro or coarse adjustment of the gap. Typically, such an adjustment is made before use of the harvester to approximate the width of stalks to be harvested. In particular, this adjustment is preferably made to result in a width of the gap corresponding to the smallest expected stalk size for a particular harvesting operation.

Referring to FIG. 4, the gap adjustment mechanism 40 includes first elongated linkage 46a with primary connection mechanism 44a and secondary connection mechanism 48a, while second elongated linkage 46b has tertiary connection mechanism 44b and quaternary connection mechanism 48b. The primary connection mechanism 44a is connected to the first deck plate 36a, the first elongated linkage 46a, and the control arm 60. The primary connection mechanism 44a is located near the proximal end of the first deck plate 36a. FIGS. 5-8 show additional details of the primary connection mechanism. An axle 50 is mounted to the mounting frame 26 and connected to control arm 60 via lingage 51. A body 52 is pivotally connected to the axle. The body 52 has a first end pivotally connected to the first deck plate 36a and a second end pivotally connected to the first elongated linkage 46a. A first resilient member 54 is mounted within the primary connection mechanism 44a between the axle 50 and the body 52. The body 52 has a bottom side including a flat edge 58b, as shown in detail in FIG. 8, for engaging the first elongated linkage.

Figure 5:
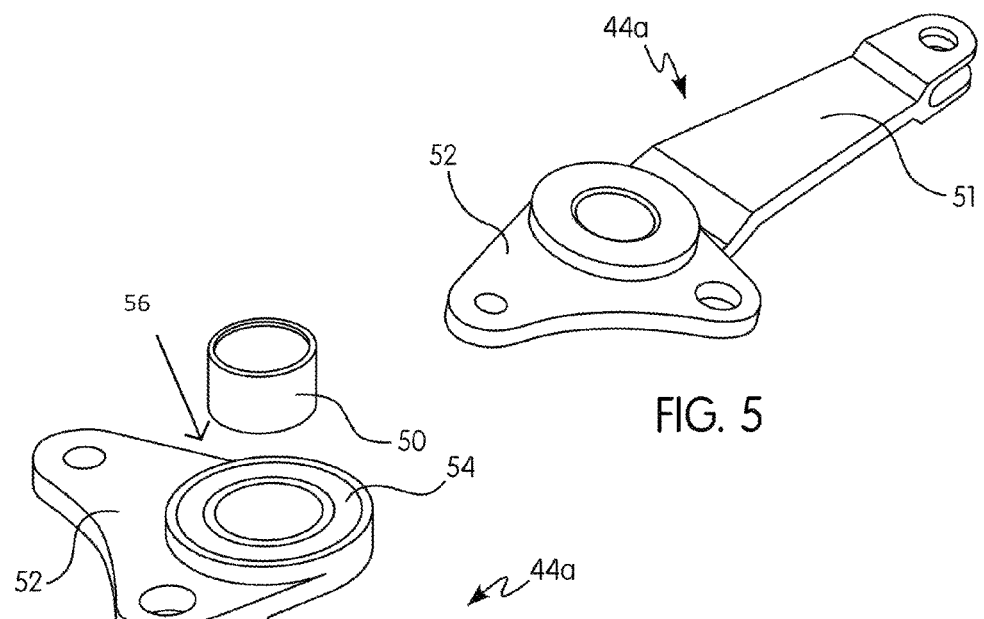
FIG. 5 is a perspective view of a primary connection mechanism of the gap adjustment mechanism of FIG. 4.
Figure 6:
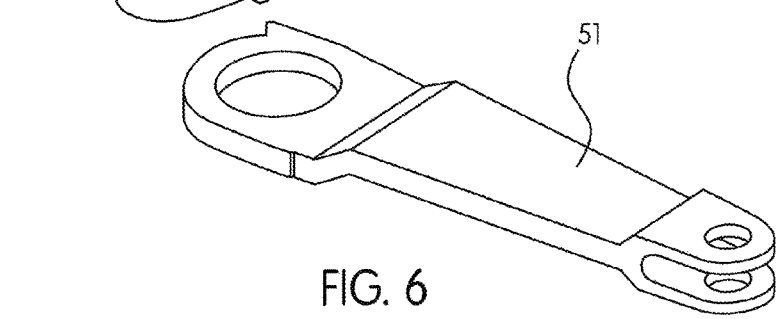
FIG. 6 is an exploded perspective view of the primary connection mechanism of FIG. 5.
Figure 7:
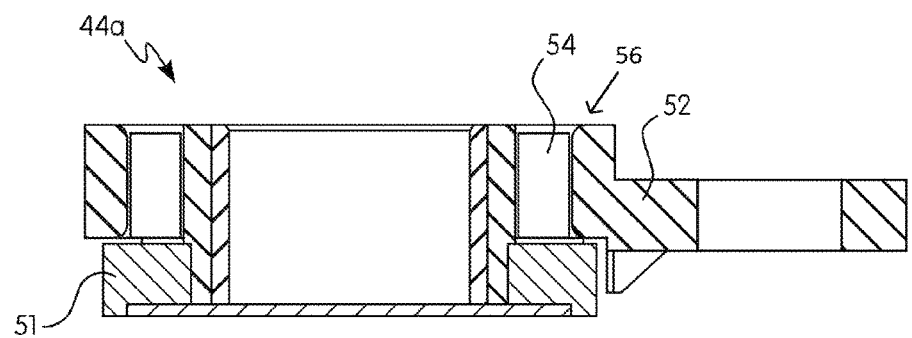
FIG. 7 is a side cross-sectional view of the primary connection mechanism of FIG. 5.
Figure 8:
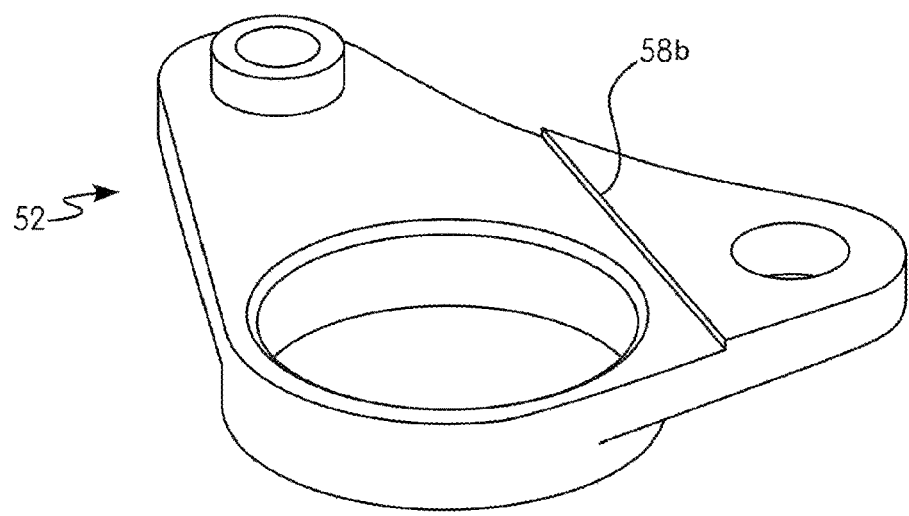
FIG. 8 is a bottom perspective view of a body of the primary connection mechanism of FIG. 5.

Referring back to FIG. 4, the primary connection mechanism 44a has first resilient member 54 that allows for micro or fine adjustment of the width of the gap in response to forces applied to the deck plates. As shown in FIGS. 5-7, first resilient member 54 is mounted at a pivotal connection 56 between the axle 50 and body 52. The first resilient member 54 in the preferred embodiment has a cylindrical shape. In other words, the first resilient member has an annular shape with an annular ring thickness in a range of about 0.25-0.75 inches. More preferably, the annular ring thickness is about 0.3-0.6 inches and most preferably about 0.50 inches. While the foregoing resilient member is preferably annular in shape, it can alternately be configured with any other size and shape suitable for its intended purpose e.g., square, oval, rectangular, crescent and the like. As shown in FIGS. 4-5, such a cylindrical shape receives loads in a radial direction when forces are transferred outwardly from the deck plates. The resilient member 54 also preferably exhibits a consistent solid outer surface so that debris cannot collect therein and seize or slow its resilient movement. Therefore, the resilient member 54 is preferably formed as a solid piece of elastomer or low durometer material. However, other alternatives for the resilient member are contemplated such as compression springs, leaf springs, foam, and the like.

When assembled as shown in FIG. 4, the resilient member 54 is located between the deck plate 36a and the control arm 60. Therefore, loads applied to the first deck plate 36a are transferred to first resilient member 54 before passing to control arm 60 and the rest of the row unit frame 26. The first resilient member 54 is preferably formed from an elastomeric material, such as an elastomer, that has a hardness value chosen to provide particular performance characteristics. Primarily, the elastomer hardness is chosen to provide a small degree of give or play when subjected to the expected loads seen during harvesting use. The elastomer hardness must also exhibit sufficient strength to withstand repeated and long use and to urge the first deck plate 36a toward the predetermined position once the force is no longer applied. Preferably, the elastomer for first resilient member 54 has a Shore A hardness value of about 50-90 Durometer, more preferably about 65-75 Durometer, and most preferably about 70 Durometer.

A second resilient member 54' is mounted within tertiary connection mechanism 44b, and functions in the same manner as first resilient member 54', resulting in an automatic micro or fine adjustment of the width of the gap, as discussed above. Second resilient member 54 is preferably configured the same as for the first resilient member 54. Together, resilient members 54 and 54' allow the width of the gap 28 to expand when a stalk that is larger than a predetermined width enters the row unit 22. Subsequently, when the stalk has passed through the row unit, the first and second resilient members 54, 54' bias the first and second deck plates 36a, 36b toward their starting predetermined positions.

Figure 9:
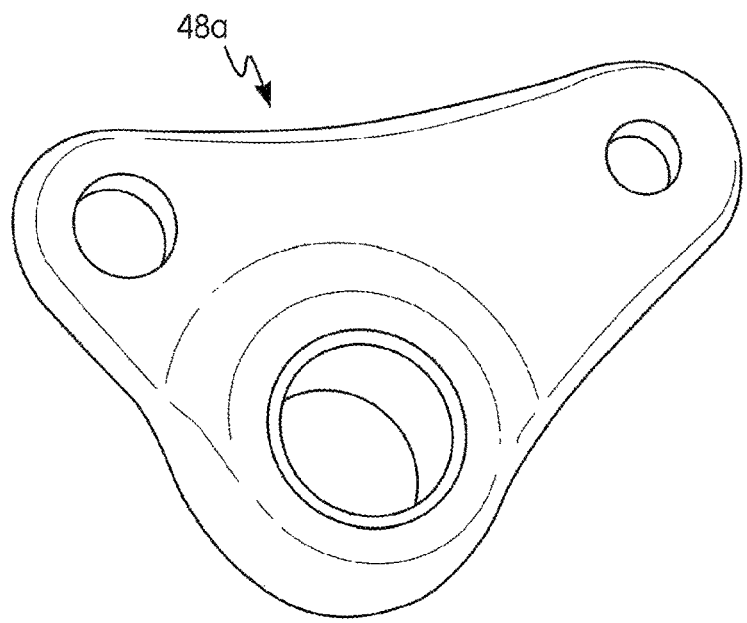
FIG. 9 is a top perspective view of a secondary connection mechanism of the gap adjustment mechanism of FIG. 4.

As shown in FIG. 4, the gap adjustment mechanism further includes secondary connection mechanism 48a, shown in detail in FIG. 9. The secondary connection mechanism is mounted the row unit frame and pivotally connected to both the first deck plate 36a and first elongated linkage 46a. Thus, movement of the primary connection mechanism by the control arm also moves the secondary connection mechanism.

Alternately expressed, the row unit 22 includes a first deck plate assembly 38a having first deck plate 36a, first elongated linkage 46a, primary connection mechanism 44a, and secondary connection mechanism 48a. Likewise the row unit 22 includes a second deck plate assembly 38b that includes second deck plate 36b, second elongated linkage 46b, tertiary connection mechanism 44b, and quaternary connection mechanism 48b. The first and second deck plate assemblies can be positionally adjusted via connection to the control arm 60.

In accordance with the present embodiment, the first and second elongated linkages 46a, 46b can move in parallel motion with the first and second longitudinally extending stripping plates 36a, 36b, respectively. This is achieved by configuring the spacing between the elongated linkage and the deck plate via the connection mechanisms e.g., connection mechanism 44a, 48a, to be the same throughout their respective range of motions.

The gap adjust mechanism in accordance with an aspect of the present invention can be configured as substantially planar when fully assembled. That is, the linkage assemblies and connection mechanisms of the gap adjustment mechanism can be configured with generally planar profiles as shown e.g., in FIGS. 3 and 4. Moreover, the linkage assemblies and connection mechanisms are positioned such that they are adjacent a lateral side of the deck plates. In this configuration, the linkage assemblies and connection mechanism are all positioned above a top surface of the row unit frame. As such, the gap adjustment mechanism of the subject application allows the entire mechanism to lay substantially within or adjacent a plane defined by the deck plate(s), thereby reducing the amount of space necessary for installation on the row units and to facilitate spacing of the row units at very narrow spacings.

In operation during harvesting, rows of plants to be harvested are aligned and directed to the gap 28 formed by the stripping plates 36a, 36b. As the agricultural harvester 10 moves across a row of crops, plants are guided towards the gap 28 where ears of corn are then stripped from the stalks between the stripping plates 36a, 36b. After separation from the ears of corn the stalks fall underneath the agricultural harvester 10 and the ears of corn are moved rearward and into the header frame 16 by the action of gathering chains 32a, 32b. Conveyor 20 then moves the ears of corn to the center of the header frame 16 so as to be fed into the feeder house 14 through the channel 18.

Further, the gap adjustment mechanism 40 allows each of the stripping plates 36a, 36b to move in parallel motion between a first position and a second position. The size of the gap 28 when the deck plates 36a, 36b are in the first position is suitable for certain stalk widths while the size of the gap 28 when the deck plates 36a, 36b are in the second position is suitable for certain other stalk widths. The size of the gap 28 generated by the gap adjustment mechanism 40 is controlled by movement of the control arm 60. The control arm 60 is operatively connected to a drive or other mechanism for changing its position, for example a motor (not shown) which is changed manually and/or remotely by an operator.

Furthermore, the first and second resilient members 54, 54' allow each of the stripping plates 36a, 36b to automatically expand or contract the gap width when forces are applied to the stripping plates, such as by a stalk that is larger than the gap 28. When such forces are applied, the first and second resilient members are configured to allow the first and second deck plates to move relative to each other for adjusting the width of the gap by a range of about 0.25-1.00 inches. More preferably, the automatic gap adjustment adjusts the width of the gap by a range of about 0.35-0.65 inches. Alternatively when such forces are applied, the first and second resilient members are configured to allow the first and second deck plates to move relative to each other for adjusting the width of the gap by a range of about 1-15 mm. More preferably, the automatic gap adjustment adjusts the width of the gap by a range of about 5-10 mm. Subsequently after separation of corn from the stalk, first and second resilient members 54, 54' bias the stripping plates 36a, 36b to a predetermined position dictated by gap adjustment mechanism 40.

The present invention advantageously provides for a gap adjustment mechanism 40 positioned above the frame 26 and/or about a top side of the frame 26 as opposed to below the frame 26. Moreover, as the gap adjustment mechanism 40 is positioned on the top side of the frame 26 all components of the gap adjustment mechanism may be serviceable from a top side of the row unit.

In sum, the row unit 22 has a deck plate connected to a control arm for macro adjustment of the deck plates to a predetermined gap width. In operation, resilient members 54, 54' provide automatic micro adjustment of the gap to accommodate stalks of varying widths. Thus, the gap is continuously maintained at an optimal width for harvesting stalks of varying sizes.

The first deck plate is timed to the second deck plate via the control arm. This same control arm can extend across the entire width of the header connecting the linkage assemblies from all of the plurality of row units. The gap spacing between the deck plates can be set to be either substantially parallel to each other or with the front of the deck plates at a different width than the gap spacing defined by the rear of the deck plates.

Systems in accordance with aspects of the present invention provide for a number of design options. For example, additional resilient members can be mounted within the secondary and quaternary connection mechanisms in a similar fashion to the resilient members at the primary and tertiary connection mechanisms. Alternatively, resilient members could be mounted at different positions, such as transversely and outboard relative to the deck plates, resulting in similar automatic minor adjustment of the gap. The parallel links of the gap adjustment mechanism can be implemented in various ways e.g., a rotating cam, a triangular link arm, an L-link arm, a pivot mechanism, or the like. Further, the shape of the control arm and parallel links can be flat, oval, round, square, L-shape, or the like. Furthermore, the gap between the deck plates can be designed to allow no gap, i.e., 100% closure of the deck plate and/or a maximum available opening predetermined and set by the operator.

It will be appreciated by those skilled in the art that changes could be made to the preferred embodiments described above without departing from the broad inventive concept thereof. For example, various resilient members may be substituted for the elastomer of the preferred embodiment. It is to be understood, therefore, that this invention is not limited to the particular embodiments disclosed, but it is intended to cover modifications within the spirit and scope of the present invention as defined by the appended claims.

We claim:

1. A row unit for a header of an agricultural harvester comprising:
   first and second deck plates mounted on a frame and defining an adjustable gap therebetween, wherein the first deck plate is movable between a first position and a second position; and
   a gap adjustment mechanism for adjusting a width of the adjustable gap, the gap adjustment mechanism including:
      a control arm,
      a first elongated linkage,
      a primary connection mechanism connecting the first deck plate to the first elongated linkage and the control arm, the primary connection mechanism having:
         a first resilient member configured to bias movement of the first deck plate towards the first position from the second position,
         an axle mounted to the control arm, and
         a body circumscribing the axle, the body having a first end connected to the first elongated linkage and a second end connected to the first deck plate, wherein the first resilient member is mounted between the axle and body, and
      a secondary connection mechanism connecting the first deck plate to the first elongated linkage.

2. The row unit of claim 1, wherein the body is configured as a bell crank, a rotating cam or a pivot mechanism.

3. The row unit of claim 1, wherein the first resilient member is mounted at a pivotal connection between the axle and body.

4. The row unit of claim 1, wherein the first position is a predetermined position and the primary and secondary connection mechanisms are configured to position the first deck plate in the predetermined position, and the first deck plate is movable from the predetermined position towards the second position relative to the control arm when the control arm is stationary.

5. The row unit of claim 1, wherein the primary connection mechanism is movable between a first position and a second position independently of the control arm.

6. The row unit of claim 1, wherein the first deck plate is movable towards the second position in response to forces applied to the first deck plate.

7. The row unit of claim 1, wherein the first resilient member has a cylindrical shape.

8. The row unit of claim 1, wherein the first resilient member has a Shore A hardness value of about 50-90 Durometer.

9. The row unit of claim 1, wherein the first resilient member has a Shore A hardness value of about 65-75 Durometer.

10. The row unit of claim 1, wherein the first resilient member has an annular shape and an annular ring thickness of about 0.25-0.75 inches.

11. The row unit of claim 1, wherein the first elongated linkage extends generally parallel to the first deck plate.

12. The row unit of claim 1, wherein the second deck plate is movable between a first position and a second position, and wherein the gap adjustment mechanism further includes:
    a second elongated linkage,
    a tertiary connection mechanism connecting the second deck plate to the second elongated linkage and the control arm, the tertiary connection mechanism having a second resilient member configured to bias movement of the second deck plate towards the first position from the second position, and a quaternary connection mechanism connecting the second deck plate to the second elongated linkage.

13. The row unit of claim 12, wherein the first and second deck plates are movable relative to each other to adjust the width of the adjustable gap by about 0.25-1.00 inches in response to forces applied to the deck plates.

14. The row unit of claim 12, wherein the first and second resilient members are configured to bias movement of the respective first and second deck plates in substantially opposite directions.

15. A row unit for a header of an agricultural harvester comprising:
   a first deck plate assembly including:
      a first deck plate movable between a first position and a second position,
      a first elongated linkage,
      a primary connection mechanism pivotably connected to the first deck plate and the first elongated linkage about substantially vertical axes, the primary connection mechanism having a first resilient member configured to bias the movement of the first deck plate towards the first position, and
      a secondary connection mechanism pivotably connected to the first deck plate and the first elongated linkage about substantially vertical axes;
   a second deck plate assembly including:
      a second deck plate movable between a first position and a second position,
      a second elongated linkage,
      a tertiary connection mechanism connecting the second deck plate and the second elongated linkage, the tertiary connection mechanism having a second resilient member configured to bias the movement of the second deck plate towards the first position, and
      a quaternary connection mechanism connecting the second deck plate and the second elongated linkage; and
   a control arm connected to the first and second deck plate assemblies,
      wherein the control arm is pivotably connected to the first deck plate assembly about a substantially vertical axis.

16. The row unit of claim 15, wherein the first resilient member has a cylindrical shape.

17. The row unit of claim 15, wherein the first resilient member has a Shore A hardness value of about 50-90 Durometer.

18. The row unit of claim 15, wherein the first resilient member has a Shore A hardness value of about 65-75 Durometer.

19. A deck plate assembly for an agricultural harvester row unit comprising:
   a deck plate;
   an elongated linkage;
   a primary connection mechanism connecting the deck plate to the elongated linkage, the primary connection mechanism including:
      an axle for mounting to a frame of the row unit,
      a body pivotably connected to the axle, the body having a first end connected to the elongated linkage and a second end connected to the deck plate, and
      a first resilient member mounted between the body and the axle and biasing movement of the deck plate in a direction opposite to a direction the deck plate moves in response to forces applied to the deck plate by crop material; and
   a secondary connection mechanism connecting the deck plate to the elongated linkage.

* * * * *